(12) United States Patent
Khine et al.

(10) Patent No.: US 10,005,248 B2
(45) Date of Patent: Jun. 26, 2018

(54) METHOD AND KIT FOR FORMING PLASTIC LENSES FROM MOLDS FORMED ON SURFACE WITH VARIED WETTABILITY

(71) Applicant: The Regents of the University of California, Oakland, CA (US)

(72) Inventors: Michelle Khine, Irvine, CA (US); Jolie McLane, Newport Beach, CA (US); Nicole Mendoza, Newport Beach, CA (US)

(73) Assignee: The Regents of the University of California, Oakland, CA (US)

( * ) Notice: Subject to any disclaimer, the term of this patent is extended or adjusted under 35 U.S.C. 154(b) by 779 days.

(21) Appl. No.: 14/491,800

(22) Filed: Sep. 19, 2014

(65) Prior Publication Data

US 2015/0084219 A1  Mar. 26, 2015

Related U.S. Application Data

(60) Provisional application No. 61/880,636, filed on Sep. 20, 2013.

(51) Int. Cl.
*B29D 11/00* (2006.01)
*B29K 105/00* (2006.01)
*B29K 23/00* (2006.01)

(52) U.S. Cl.
CPC ...... *B29D 11/0048* (2013.01); *B29K 2023/38* (2013.01); *B29K 2105/0085* (2013.01); *B29K 2883/00* (2013.01)

(58) Field of Classification Search
CPC ... B29D 11/00; B29D 11/0048; B29D 11/005; B29D 11/00509; B29D 11/00519; B29D 11/00538; B29D 11/00557
See application file for complete search history.

(56) References Cited

U.S. PATENT DOCUMENTS

| | | | |
|---|---|---|---|
| 5,858,262 A * | 1/1999 | Lebensfeld | A63H 9/00 249/123 |
| 2003/0123155 A1* | 7/2003 | Quake | B01L 3/502715 359/664 |
| 2007/0092407 A1 | 4/2007 | Xiao et al. | |
| 2009/0281250 A1 | 11/2009 | DeSimone et al. | |

(Continued)

OTHER PUBLICATIONS

Blanco-Gomez, G.; Flendrig, L.M.; Cooper, J.M, "Hysteresis and Reversibility of a Superhydrophobic Photopatternable Silicon Elastomer", Langmuir, Feb. 24, 2010, vol. 26, No. 10, 7248-7253.

(Continued)

*Primary Examiner* — Lisa L Herring
(74) *Attorney, Agent, or Firm* — Knobbe Martens Olson & Bear LLP

(57) ABSTRACT

This disclosure provides a monolithic mold including a plurality of lens forming features that can be used to simultaneously form a plurality of lenses with different sizes and shapes. The mold can be formed by disposing a polymeric material around a plurality of physical objects with different shapes and sized. A method of forming the mold includes providing a substrate that has a surface with regions of low and high wettability. Water is deposited on the surface such that water droplets are formed with different contact angles. The mold is formed around the droplets.

15 Claims, 12 Drawing Sheets

(56) References Cited

U.S. PATENT DOCUMENTS

| | | | |
|---|---|---|---|
| 2010/0148393 A1* | 6/2010 | Carrillo | B29C 33/3857 |
| | | | 264/227 |
| 2011/0181961 A1* | 7/2011 | Imai | B29C 33/42 |
| | | | 359/642 |
| 2016/0169867 A1 | 6/2016 | Khine et al. | |

OTHER PUBLICATIONS

Bormashenko, E.; Pogreb, R.; Whyman, G.; Erlich, M., "Cassie-Wenzel Transition in Vibrating Drops Deposited on Rough Surfaces: Is the Dynamic Cassie-Wenzel Wetting Transition a 2D or 1D Affair?", Langmuir, 2007, vol. 23, No. 12, 6501-6503.

Bormashenko, E.; Pogreb, R.; Whyman, G.; Erlich, M., "Resonance Cassie-Wenzel Wetting Transition for Horizontally Vibrated Drops Deposited on a Rough Surface", Langmuir, 2007, vol. 23, No. 24, 12217-12221.

Cassie, A.B.D.; Baxter, S., "Wettability of Porous Surfaces." Transactions of the Faraday Society, Jun. 19, 1944, vol. 40, 546-551.

Cheng, Y.T.; Rodak, D.E.; Wong, C.A.; Hayden, C.A., "Effects of Micro- and Nano-Structures of the Self-Cleaning Behavior of Lotus Leaves", Nanotechnology, Feb. 2006, vol. 17, No. 5, 1359-1362.

Choi, C.H.; Kim, C.J., "Droplet Evaporation of Pure Water and Protein Solution on Nanostructured Superhydrophobic Surfaces of Varying Heights", Langmuir, Jun. 11, 2009, vol. 25, No. 13, 7561-7567.

Cortese, B.; D'Amone, S.; Manca, M.; Viola, I.; Cingolani, R.; Gigli, G., "Superhydrophobicity Due to the Hierarchical Scale Roughness of PDMS Surface", Langmuir, Jan. 1, 2008, vol. 24, No. 6, 2712-2718.

De Angelis, F.; Gentile, F.; Mecarini, F.; Das, G.; Moretti, M.; Candeloro, P.; Coluccio, M.L.; Cojoc, G.; Accardo, A.; Liberale, C.; Zaccaria, R.P.; Perozziello, G.; Tirinato, L.; Toma, A.; Cuda, G.; Cingolani, R.; Di Fabrizio, E., "Breaking the Diffusion Limit With Super-Hydrophobic Delivery of Molecules to Plasmonic Nanofocusing SERS Structures", Nature Photonics, Sep. 18, 2011, vol. 5, 682-687.

Freschauf, L.R., et. al., "Shrink-Induced Superhydrophobic and Antibacterial Surfaces in Consumer Plastics," PLoS ONE, Aug. 20, 2012, vol. 7, No. 8, e40987.

Fu, C.C.; Grimes, A.; Long, M.; Ferri, C.G.L.; Rich, B.D.; Ghosh, S.; Ghosh, S.; Lee, L.P.; Gopinathan, A.; Khine, M., "Tunable Nanowrinkles on Shape Memory Polymer Sheets" Advanced Materials, Aug. 20, 2009, vol. 21, No. 44, 4472-44765.

Gentile F.; Coluccio M.L.; Coppede N.; Mecarini F.; Das G.; Liberale C.; Tirinato L.; Leoncini M.; Perozziello G.; Candelero P.; DeAngelis F.; Di Fabrizio E., "Superhydrophobic Surfaces as Smart Platforms for the Analysis of Diluted Biological Solutions", ACS Applied Materials & Interfaces, May 23, 2012, vol. 4, No. 6, 3213-3224.

Jayadev, S.; Pegan, J.; Dyer, D.; McLane, J.; Lim, J.; Khine, M., "Adaptive Wettability-Enhanced Surfaces Ordered on Molded Etched Substrates Using Shrink Film", Smart Materials and Structures, Dec. 18, 2012, vol. 22, No. 1, 1-6.

Jung, Y.C.; Bhushan, B., "Wetting Behavior During Evaporation and Condensation of Water Microdroplets on Superhydrophobic Patterned Surfaces", Journal of Microscopy, 2008, vol. 229, No. 1, 127-140.

Khare, K.; Zhou, J.; Yang, S., "Tunable Open-Channel Microfluidics on Soft Poly (dimethylsiloxane) (PDMS) Substrates with Sinusoidal Grooves", Langmuir, Jul. 2, 2009, vol. 25, No. 21, 12794-12799.

Lafuma, A.; Quere, D., "Superhydrophobic States", Nature Materials, Jun. 22, 2003, vol. 2, No. 7, 457-460.

Li, W.; Amirfazli, A., "A Thermodynamic Approach for Determining the Contact Angle Hysteresis for Superhydrophobic Surfaces", Journal of Colloid and Interface Science, Dec. 2005, vol. 292, No. 1, 195-201.

Ma, M.; Hill, R.M., "Superhydrophobic Surfaces", Current Opinion in Colloid and Interface Science, Oct. 31, 2006, vol. 11, No. 4, 193-202.

McHale, G.; Aqil, S.; Shirtcliffe, N.J.; Newton, M.I.; Erbil, H.Y., "Analysis of Droplet Evaporation on a Superhydrophobic Surface", Langmuir, Oct. 14, 2005, vol. 21, No. 24, 11053-11060.

McLane J., et. al., "Enhanced Detection of Protein in Urine by Droplet Evaporation on a Superhydrophobic Plastic." Advanced Materials Interfaces, Jan. 7, 2015, vol. 2, No. 1, 140034 (1-7).

McLauchlin, M.L.; Yang, D.; Aella, P.; Garcia, A.A.; Picraux, S.T.; Hayes, M.A., "Evaporative Properties and Pinning Strength of Laser-Ablated, Hydrophilic States on Lotus-Leaf-like, Nanostructured Surfaces", Langmuir, Mar. 24, 2007, vol. 23, No. 9, 4871-4877.

Öner, D.; McCarthy, T.J., "Ultrahydrophobic Surfaces. Effects of Topography Length Scales on Wettability", Langmuir, Aug. 26, 2000, vol. 16, No. 20, 7777-7782.

Popov, Y.O., "Evaporative Deposition Patterns: Spatial Dimensions of the Deposit", Physical Review E., Mar. 28, 2005, vol. 71, No. 3, 036313-1-17.

Schneider, J.; Garcia, A.A., "Rapid Antigen Detection Using the Liquid Sample As a Lens and Self-Mixer for Light Scattering Detection", Nature Precedings. 2010.

Seemann, R.; Brinkmann, M.; Kramer, E.J.; Lange, F.F.; Lipowsky, R., "Wetting Morphologies at Microstructured Surfaces", PNAS, Feb. 8, 2005, vol. 102, No. 6, 1848-1852.

Sommer, A.P.; Rozlosnik, N., "Formation of Crystalline Ring Patterns on Extremely Hydrophobic Supersmooth Substrates: Extension of Ring Formation Paradigms", Crystal Growth & Design, Feb. 15, 2005, vol. 5, No. 2, 551-557.

Stalder, A.F.; Melchior, T.; Müller, M.; Sage, D.; Blu, T.; et. al., "Low-Bond Axisymmetric Drop Shape Analysis for Surface Tension and Contact Angle Measurements of Sessile Drops", Colloids and Surfaces: A: Physicochemical and Engineering Aspects, Jul. 20, 2010, vol. 364, No. 1, 72-81.

Wenzel, R.N., "Resistance of Solid Surfaces to Wetting by Water", Industrial and Engineering Chemical, Aug. 28, 1936, vol. 28, No. 8, 988-994.

Young, T., "An Essay on the Cohesion of Fluids", Philosophical Transactions of the Royal Society of London, Jan. 1, 1805, vol. 95, 65-87.

Zhang, X.; Tan, S.; Zhao, N.; Guo, X.; Zhang, Y.; Xu, J., "Evaporation of Sessile Water Droplets on Superhydrophobic Natural Lotus and Biomimetic Polymer Surfaces", ChemPhysChem., Oct. 13, 2006, vol. 7, No. 10, 2067-2070.

Zhu, L.; Xiu, Y.; Xu, J.; Tamirisa, P.A.; Hess, D.W.; et. al., "Superhydrophobicity on Two-Tier Rough Surfaces Fabricated by Controlled Growth of Aligned Carbon Nanotube Arrays Coated with Fluorocarbon", Langmuir, Oct. 7, 2005, vol. 21, No. 24, 11208-11212.

Kim, et al., "Fabrication of PDMS Microlenses With Various Curvatures Using a Water-Based Molding Method", Twelfth International Conference on Miniaturized Systems for Chemistry and Life Sciences, Oct. 12-16, 2008, pp. 994-996.

\* cited by examiner

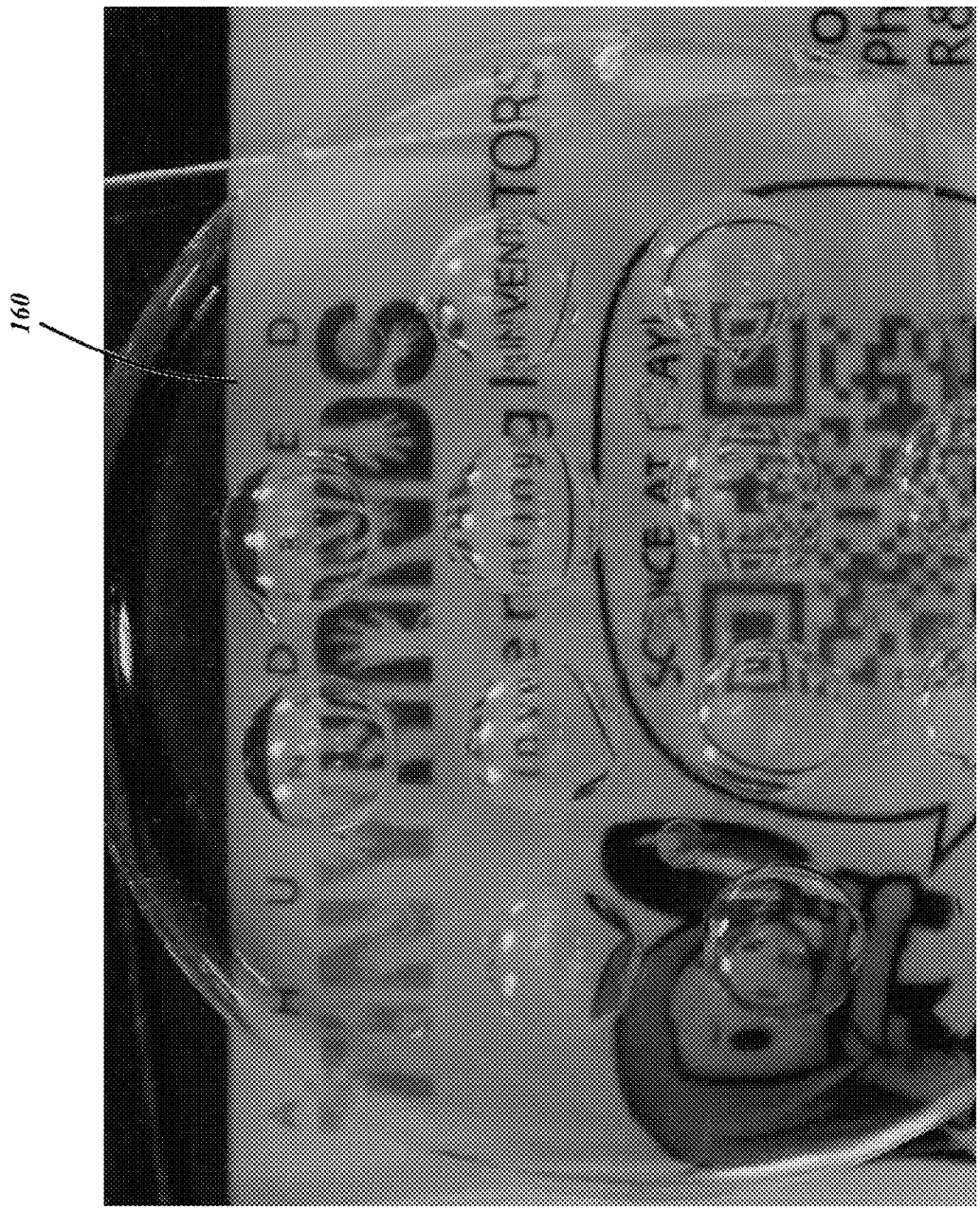

METHOD AND KIT FOR FORMING PLASTIC LENSES FROM MOLDS FORMED ON SURFACE WITH VARIED WETTABILITY

CROSS-REFERENCE TO RELATED APPLICATIONS

The present application claims benefit under 35 U.S.C. § 119(e) of U.S. Provisional Application No. 61/880,636, filed on Sep. 20, 2013 and titled "Method and Kit for Forming Plastic Lenses from Molds formed on Surface with Varied Wettability." The disclosure of the above identified provisional patent application is incorporated by reference herein in its entirety.

STATEMENT REGARDING FEDERALLY SPONSORED R&D

The inventions were made with government support under grant N66001-4003 awarded by Defense Advanced Research Projects Agency (DARPA), grant DGE 0549479 awarded by NSF LifeChips, grant 442870-30031 awarded by NIH New Innovators and grant GM 55246-17 awarded by NIH MBRS R25. The government may have certain rights in the inventions.

BACKGROUND OF THE INVENTION

Field of the Invention

This application is directed to methods of making molds for plastic lenses, lenses produced by such molds, and kits including such lenses and/or molds.

Description of the Related Art

Miniaturization of optical and optoelectronic devices is useful and in some cases necessary for imaging small scale objects such as biological components. In addition, there is interest to move from glass to polymer lenses. Current fabrication techniques for producing small plastic lenses use photolithography, laser ablation, or UV curable materials. Photoresist has been used to create hemispherical shaped lenses based on the photoresist's surface tension. The photoresist method is limited in geometry and requires certain thickness of photoresist, limiting the numerical aperture to >0.15.

SUMMARY OF THE INVENTION

There is a need, however, for simple and inexpensive manufacturing techniques to produce smooth, symmetrical lenses with high magnification. Also, although polydimethylsiloxane (PDMS) is used to mold masters and transfer features, there is still a need to produce an inexpensive lens master.

Various embodiments of the method of fabricating plastic lenses utilizes prestressed polyolefin (PO) to produce superhydrophobic (SH) features, which can be used to create novel surfaces in PDMS and hard plastics. Water beads up on these SH surfaces due to water's high surface tension and the surface's low surface energy. By controlling the surface energy, the shapes of water droplets can be easily controlled. Surface energy can be controlled with chemical modification and treatments. The shape of the water droplet can achieve smooth, symmetrical lenses due to the inherent surface tension of water. These shapes can then be molded with PDMS or other convenient plastic mold forming material, and subsequently with hard plastics to achieve smooth, symmetrical, and tunable optical lenses.

The SH surfaces are created in plastics in a simple and inexpensive manner. As discussed further below, the shape of water droplets is controlled by controlling the surface energy (or wettability) of portions of a surface. For example, some portions of the surface can be configured to be superhydrophobic and other portions of the surface can be configured to have increased wettability. The surface energy of portions of a surface can be controlled by using chemical and/or physical methods. For example, an example method of fabricating lenses with different amounts of magnification included masking portions of a superhydrophobic surface with a mask. Portions of the superhydrophobic surface that are exposed by the mask can be altered (e.g., by a chemical process) to be hydrophilic (or increased wettability). Water deposited on a surface having portions with different amounts of wettability (e.g., superhydrophoic or superhydrophillic) will bead up to form water droplets with different contact angles (CA) depending on the degree of wettability. For example, in portions of the surface that are superhydrophic, water droplets can have contact angles greater than or equal to about 120 degrees (e.g., between about 120-150 degrees or between about 150-180 degrees). In portions of the surface that are superhydrophilic, water droplets can have contact angles less than or equal to about 25 degrees (e.g., between about 1-10 degrees or between about 10-25 degrees). Thus, water droplets having shapes with different amounts of concavity (e.g., almost spherical, hemispherical or almost flat) can be formed. The water droplets with varying amounts of concavity can be molded with PDMS to form smooth inverse lenses. The inverse lenses can be used to mold a lens, e.g., using cyclic olefin copolymer (COC). The entire process can be scaled up for large manufacturing and all steps are inexpensive. The shape of the water droplets can also form lenses with high numerical apertures for high magnification. The fabrication method does not require expensive equipment, and the lenses can even be produced in a classroom setting, making them ideal for educational outreach tools.

In one application, kits are provided to teach students about optics. In other applications, these lenses can also be integrated with electronics such as a cell phone camera as an inexpensive, high magnification tool. This can be especially helpful for point-of-care (POC) diagnostics or in regions where costly and bulky microscopes are not accessible. The lenses may be able to observe very small objects such as biological components due to the shape of the lens.

In one embodiment, a method of forming a lens is provided. A substrate that has a superhydrophobic surface is provided. Portions of the superhydrophobic surface of the substrate are masked. Regions of the superhydrophobic surface are exposed to a process by which the wettability of the exposed regions of the surface is enhanced. Water is deposited on the surface. Droplets are formed on the surface in the regions that have enhanced wettability. An inverse lens mold is formed around the droplets.

In one use, a kit is provided. The kit has a mold that has a plurality of lens forming features. The kit also has a vial of a lens forming polymer and a compression device. The compression device is configured to hold the lens forming polymer in the lens forming features.

One innovative aspect of the subject matter disclosed herein can be implemented in a kit comprising a monolithic mold having a first surface and a second surface. The mold encloses a volume of a mold material between the first and the second surface. The mold includes a plurality of lens forming features open to the first surface and extending through the volume of the mold material toward the second surface. A cross-section of at least one of the plurality of lens forming features in a plane perpendicular to the first surface includes a curve. The at least one lens forming feature is undercut such that a minimum spacing between opposing sides of the curve at a first location adjacent to the first surface is less than the minimum spacing between opposing sides of the curve at a second location between the first location and the second surface of the mold. The kit further comprises an amount of a lens forming polymer sufficient to fill the plurality of lens forming features.

In various implementations, the kit can further comprise a compression device configured to hold the lens forming polymer in the lens forming features. The kit can further comprise a set of instruction for directing the use of the kit. The kit can be used to form one or more lenses by using the mold and the mold forming polymer.

An innovative aspect of the subject matter disclosed herein can be implemented in a method of forming a mold including a plurality of lens forming features by flowing a polymeric material around a plurality of physical objects. The mold formed by the methods described herein can be included with the kit to form lenses. In various implementations, some of the plurality of physical objects can have a different size than some other of the plurality of physical objects. In various implementations, some of the plurality of physical objects can have a different shape than some other of the plurality of physical objects. Some of the plurality of physical objects can comprise a solid material. In some implementations, some of the plurality of physical objects can comprise one or more water droplet. The water droplets can be formed by disposing water on a substrate with regions of higher and lower wettability. The water droplets can have a contact angle (CA) between about 5 degrees and about 180 degrees.

The lens forming features can have a size such that the lenses formed by molding the lens forming polymer using the mold can provide optical magnification between about 1× and about 100×. For example, the lens forming features can have a size such that the lenses formed by molding the lens forming polymer using the mold can provide optical magnification between about 10× and about 75×, between about 20× and about 50×, or there between. In various implementations, the lens forming features can have a dimension (e.g., length of a radius, length of diameter, length of a major axis, length of a minor axis, length of the largest chord joining opposing sides of the internal surface of the lens forming features, etc.) that is between about 1 mm and about 1 cm. In various implementations, the lens forming features can have a dimension (e.g., length of a radius, length of diameter, length of a major axis, length of a minor axis, length of the largest chord joining opposing sides of the internal surface of the lens forming features, etc.) that is between about 1 cm and about 10 cm.

Another innovative aspect of the subject matter disclosed herein can be implemented in a method of forming a mold including a plurality of lens forming features. The method comprises patterning a surface of a substrate to create regions with higher wettability and lower wettability. The method further comprises depositing water on the surface to form droplets having a contact angle between about 5 degrees and about 180 degrees. The contact angle of water droplets formed is higher in a region with lower wettability and lower in a region with higher wettability. The method further comprises disposing a mold material around the droplets to form a mold including a plurality of lens forming features. The lens forming features have a shape that is inverse of the shape of the plurality of water droplets.

In various implementations, the mold material can comprise a polymeric material. For example, the mold material can comprise polydimethylsiloxane (PDMS). The mold formed by the methods disclosed herein is a monolithic structure that can be used to simultaneously form a plurality of lenses with different shapes and sizes. The plurality of lenses can be formed by disposing a plastic material into the mold such that the plastic material fills the lens forming features and solidifying the plastic material. In various implementations, the mold can be flexible such that the solidified plastic material including a plurality of lenses can be separated from the mold. In various implementations, the plastic material can comprise an optical grade polymer. In various implementations, the plastic material can comprise cyclic olefin copolymer.

Yet another innovative aspect of the subject material is disclosed in a mold for producing optical elements. The mold comprises a first surface; a second surface disposed away from the first surface; a monolithic volume of a flexible mold material disposed between the first surface and the second surface; a cavity extending from an aperture disposed on the first surface into the volume of the mold material in the direction of the second surface; and an internal wall disposed about the cavity. The internal wall of the cavity is configured for forming at least one optical surface of an optical element. The internal wall of the cavity has a size such that a largest chord from opposing sides of the internal wall has a length between about 1 mm and about 1 cm. The internal wall at least partially bounds an undercut structure providing an external angle greater than 90 degrees, wherein the external angle is disposed between a tangent to the internal wall adjacent to first surface and a plane of the first surface including a portion of the cavity.

In various implementations, the internal wall can include a first convex profile from the aperture toward the second surface and a second convex profile extending between the first convex profile and the second surface. The mold can further comprise a second cavity extending from a second aperture disposed on the first surface into the volume of the mold material in the direction of the second surface. The second cavity comprises an internal wall configured to form at least one optical surface of a second optical element. The second cavity has a shape such that the internal wall of the second cavity does not bound an undercut structure. An external angle disposed between a tangent to the internal wall of the second cavity adjacent to first surface and a plane of the first surface and including a portion of the second cavity is less than or equal to 90 degrees.

In various implementations, the lens formed by the second cavity can have a different magnification from the lens formed by the cavity. The mold can be used to form one or more imaging lenses.

BRIEF DESCRIPTION OF THE DRAWINGS

These and other features, aspects and advantages are described below with reference to the drawings, which are intended to illustrate but not to limit the inventions. In the drawings, like reference characters denote corresponding features consistently throughout similar embodiments.

FIG. 7C shows the optical effects produced by the mold formed in FIG. 6;

DETAILED DESCRIPTION OF THE PREFERRED EMBODIMENT

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

This application is directed to methods, devices and kits for producing low cost plastic lenses that have a variety of applications, including industrial, consumer, and educational. Features of the lens can be selected over a much wider range than was possible in previous techniques by altering the method of manufacturing, including by controlling the wettability of a surface. In this sense, the process is considered tunable or capable of producing tunable optical lenses. That is features of a mold or lens produced by the mold can be tailored.

I. Method of Manufacturing Tunable Optical Molds and Lenses

FIGS. 1-5B illustrate methods of making tunable lenses and optical quality molds for making such lenses. The lenses can have high magnification properties. The lenses and optical quality molds are created using simple cast and mold operations, and novel techniques for controlling the shape of water droplets.

Figure 1:
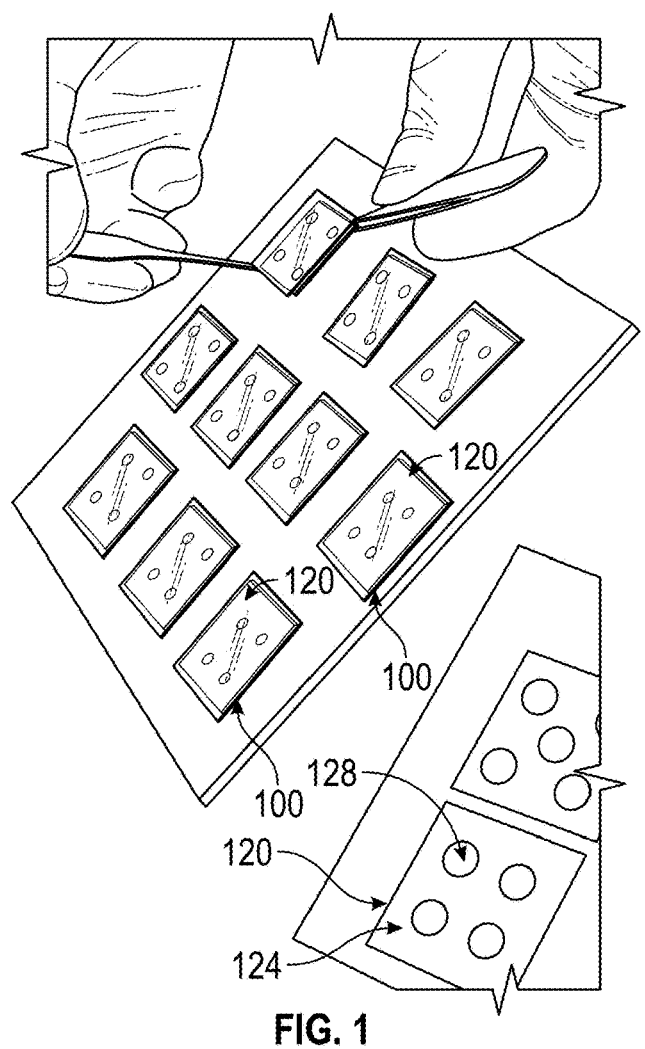
FIG. 1 shows early operations of a process for making lenses, which exploits the properties of on superhydrophobic surfaces.

FIG. 1 shows a substrate 100 that has a lower wettability characteristic. For example, the substrate 100 can have a superhydrophobic (SH) characteristic. In various implementations, the substrate 100 can be made of a material and/or be processed to have at least one superhydrophobic (SH) surface. The SH surface can have micro- to nano-scale features that prevent water from wetting the entire surface. In various implementations described herein, the SH surface can comprise prestressed polyolefin (PO) including a plurality of micro- to nano-scale features (also referred to as SH features) that are formed by heating the prestressed PO. In general, water beads up on these SH surfaces due to water's high surface tension and the surface's low surface energy.

FIG. 1 also illustrates methods of varying the SH features, which can alter the configuration of the water droplet as it beads up. For example, it may be desired to produce lenses with varying sizes, contact angles (CA), or both size and contact angle on the substrate 100. By providing regions having lower and higher wettability, such variations in lens sizes and/or shapes can be achieved. In various implementations, the regions with lower and higher wettability can be produced by disposing a mask 120 on the substrate 100. In various implementations, the mask 120 can be patterned on substrate 100. The mask 120 includes a first region 124 and a second region 128. The first region 124 of the mask is configured to be disposed over a first portion of the substrate 100. The first region 124 is configured to cover the first portion of the substrate 100 to reduce, minimize or eliminate changes in the wettability characteristic of the first portion. The second region 128 is configured to permit a change in the wettability characteristic of the second portion of the substrate 100. In some embodiments of the mask 120, the first region 124 is a continuous film portion and the second region 128 is a through-hole or aperture in the mask 120. In other embodiments, the first portion 124 can be an opaque structure and the second portion 128 can be a clear structure.

The mask 120 can be produced using a variety of known mask producing techniques. In one implementation, the mask 120 can be produced by using a plasma etching device. The second region of the mask 120 can include one or more surface or volume features. In various implementations, the mask 120 can be laser cut to produce highly accurate features in the second regions 128. The features can include a plurality of through-holes, a plurality of apertures, a plurality of slits, etc. One or more of the features in the second regions 128 can be sized and shaped differently from other features in the second regions 128. Alternately, in various implementations, all the features in the second regions 128 can have the same size and shape. For example, as discussed above, in one implementation, the features include a plurality of through-holes in the masks at the second regions 128. The through-holes can have consistent sizes or can have different sizes within a single mask 120 depending on the application. FIG. 1 also shows an array of substrate-mask assemblies, each substrate-mask assembly including a substrate 100 and a mask 120. The substrate-mask assemblies can be held together during a process to alter the wettability of the different regions of the substrate 100.

As noted above, the substrate 100 preferably has a very low wettability such that water naturally beads-up to a high extent. If unaltered, water disposed on the substrate 100 would bead up to for droplets. The size and shape of the droplets will depend on the wettability of the surface and the material characteristics of water. If the substrate 100 is superhydrophobic then water droplets can have a contact angle greater than 120 degrees. For example, the contact angle can be between 120 degrees and 180 degrees if the wettability of the substrate 100 is sufficiently low. In order to alter the contact angle of the water droplets to vary the size and shape of the water droplets, portions of the substrate 100 that are underlying the region 128 of the mask 120 are altered to have higher wettability. In various implementations, the portions of the substrate 100 underlying the region 128 of the mask 120 can be made superhydrophilic. Any suitable technique can be used to alter the surface energy (and thereby wettability) of the portions of the substrate 100 underlying the region 128 of the mask 120. For example, a chemical modification (e.g., plasma treatment) can be used to alter the surface energy and/or wettability of the portions of the substrate 100 underlying the region 128.

A substrate 100 having regions with higher and lower wettability can be produced by the above described method. Water disposed on a substrate 100 having regions with higher and lower wettability would from plurality water droplets having different sizes, shaped and contact angles depending on the material characteristic of the water and the wettability characteristic of the substrate 100. The shape of the water droplets is determined by the interplay between the surface tension of the water droplets and the energy of the surface. Accordingly, by controlling the size of the water droplets and the energy of the surface (or wettability) different shapes of the water droplets can be achieved. Stated another way, the methods described herein allow for the surface energy to be specifically modified to provide more control over a larger range of contact angles. Accordingly, the shapes of water droplets formed in the second portions of the substrate (e.g., portions of the substrate corresponding to the second regions 128 of the mask 120) can be controlled by controlling the size of the second portions and the surface energy (or wettability) of the second portions. In this manner, the contact angle of water droplets formed thereby can be reduced from the high angles at the first portions of the substrate that have lower wettability to lower contact angles at the second portions of the substrate that have higher wettability.

In various implementations, the contact angle of the various water droplets can be tuned by varying the size of the water droplets. In such implementations, a small size water droplet can have a larger contact angle as compared to a large size water droplet. The size of the water droplets can be controlled by controlling the size of the features (e.g., apertures or through-holes) in the second regions 128 of the mask. As discussed above a laser cutting tool can be used to accurately produce features in the second regions 128 with different sizes. Accordingly, the size of the water droplets in the second portions of the substrate 100 can be accurately and precisely controlled.

In other techniques, the size of the second portions of the substrate 100 that are chemically altered to have higher wettability may not be equal to the size of the corresponding features in the second regions 128 of the mask. For example, in some implementations, the size of the second portions of the substrate 100 may be greater than or smaller than the size of the corresponding features in the second regions 128 of the mask. In such implementations, the shape and the contact angle of the water droplets may depend on both the size and the surface energy of the second portions of the substrate 100.

A mold material can be disposed on the plurality of water droplets to form a mold. The mold formed in this manner would have features having a surface profile that is inverse of the surface profile of the water droplets. For example, if the water droplets have a convex surface, then the mold would have features with a concave surface. The shape of the water droplet can achieve smooth, symmetrical features in the mold. Accordingly, the mold formed in this manner can be used to form lenses or other optical elements lens. Since, water droplets having different sizes and shapes can be formed on the substrate by varying the wettability characteristic of the different regions of the substrate, features with different shapes and sizes can be formed in a single mold. Accordingly, the single mold can be advantageously used to simultaneously form lenses or optical element having different shapes, sizes and optical magnification.

Figure 2:
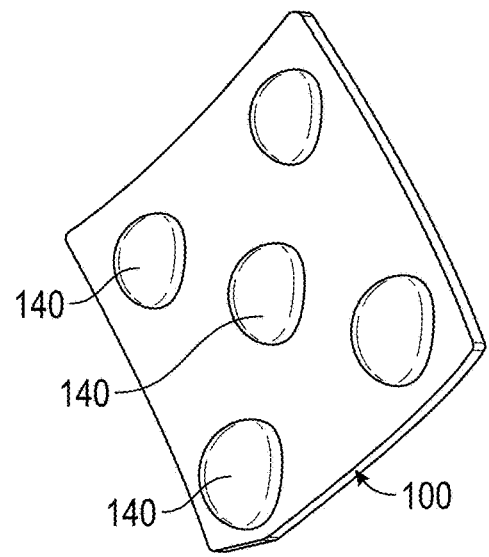
FIG. 2 shows a subsequent operation to that shown in FIG. 1, in which a droplet is placed on the SH surface prior to making a lens mold.

FIG. 2 shows an operation in the process of manufacturing a mold in which water droplets 140 are formed at the second portions of the substrate 100 having higher wettability. As discussed above, the surface properties of the substrate 100 are configured to have lower wettability in first portions of the substrate 100 and higher wettability in second portions of the substrate. In various implementations, the second portions can be regions that have superhydrophilicity. The second portions of the substrate 100 can be considered droplet forming regions and can be configured to have different shapes such that water disposed on the second regions can bead up to form different shapes and structures. For example, the second portions of the substrate 100 with higher wettability can be configured as circular or elliptical regions, such that the water droplets 140 have circular or elliptical surface. As another example, the second portions can be configured to have an oblong or a barrel shape, such that water can bead up to form cylindrical structures. The combination of surface properties of the first and second portions of the substrate 100 effectively contains the water droplets during subsequent steps.

Figure 3:
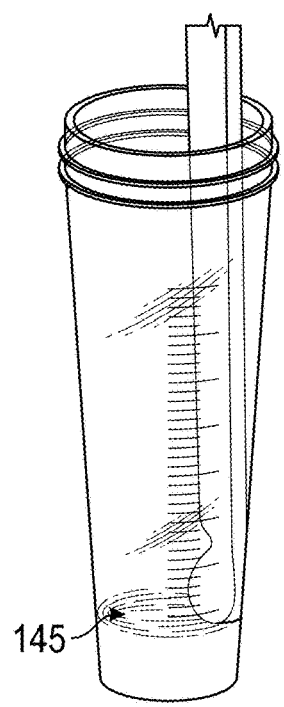
FIG. 3 shows a subsequent operation to that shown in FIG. 2, in which a mold forming material such as polydimethylsiloxane (PDMS) is used to form a mold with inverse lenses.

FIG. 3 illustrates a subsequent operation in the process of making a mold in which a curable agent 145 is disposed over the droplets formed on the substrate 100. The curable agent 145 can be any polymer that solidifies around the water droplets 140. Preferably the material interface with the droplet 140 creates a high quality lens forming features. One curable agent 145 is polydimethylsiloxane (PDMS), which can be used to achieve highly smooth and symmetrical inverse lens forming features. In the illustrated method, the PDMS is contained in a vial and is poured over the substrate 100 to immerse the droplets in liquid PDMS. The PDMS is later cured and the cured mass separated from the substrate 100. The cured PDMS will include a lens forming mold 160 and will have concave lens forming feature therein in which lenses are formed.

Figure 4:
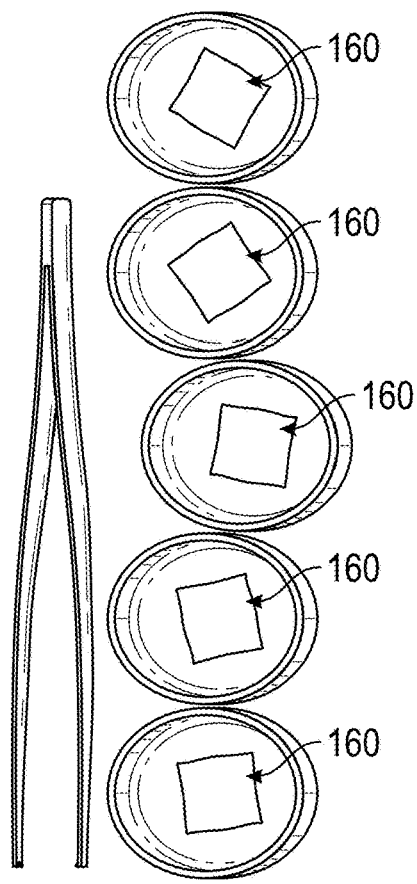
FIG. 4 shows a subsequent operation to that shown in FIG. 3, in which solidified PDMS molds have been formed and are packaged.

FIG. 4 shows a plurality of the molds 160 in various containers stored for later use. In one later use, the lens forming features of the mold 160 are filled with a suitable lens forming polymer, such as cyclic olefin copolymer (COC). If the molds 160 have varying spot sizes and/or the second portions of the substrate 100 (that treated in connection with FIG. 3) have different surface energies, the process will yield a plurality of lenses with various magnifications. The COC can be loaded into the lens forming features in various forms, e.g., liquid or pellet. Other materials could be used as well, preferably producing smooth, symmetrical, optical hard plastic lenses. The lenses will have been tuned to have a desired size, shape, radius, by the process outlined above. The lenses may also have been tuned to desired magnification and/or numerical aperture.

Figure 5A:
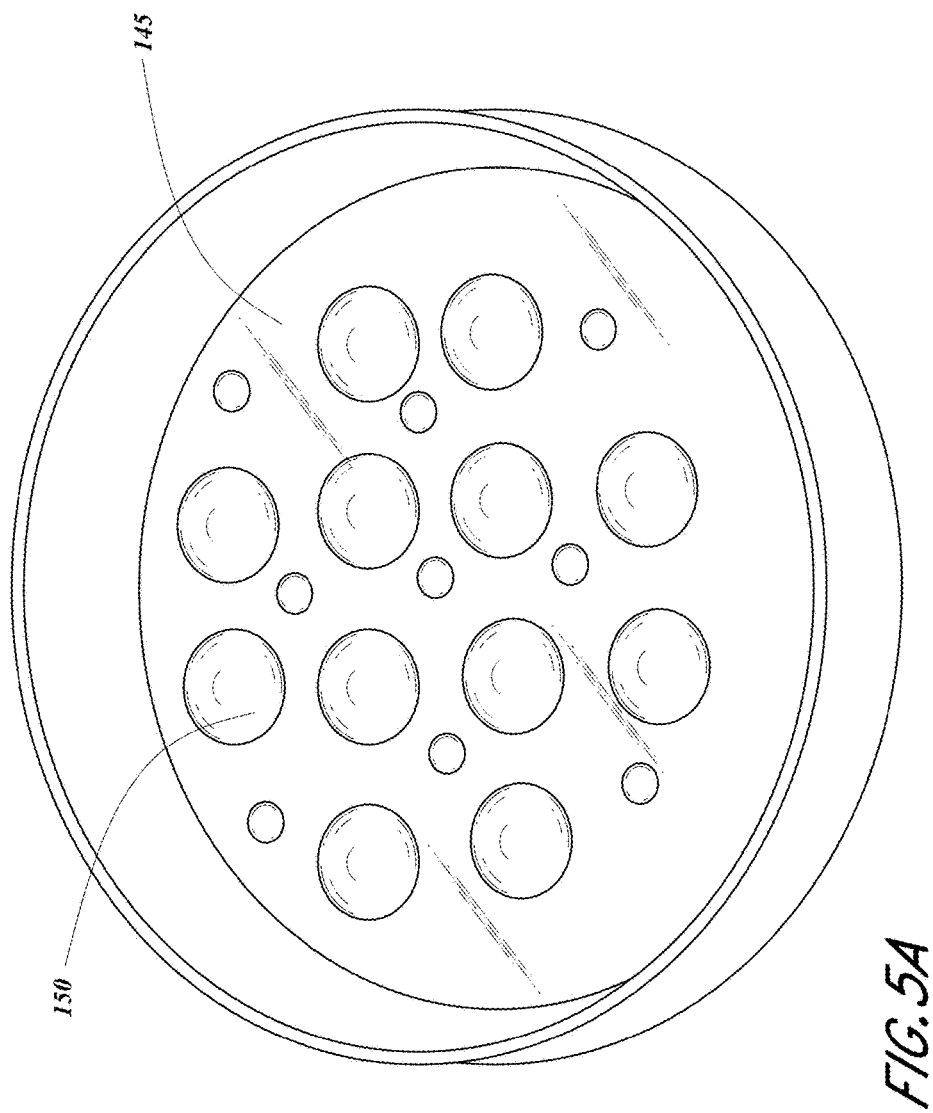
FIGS. 5A and 5B illustrate implementations of another method to form a mold with inverse lens forming features.
Figure 5B:
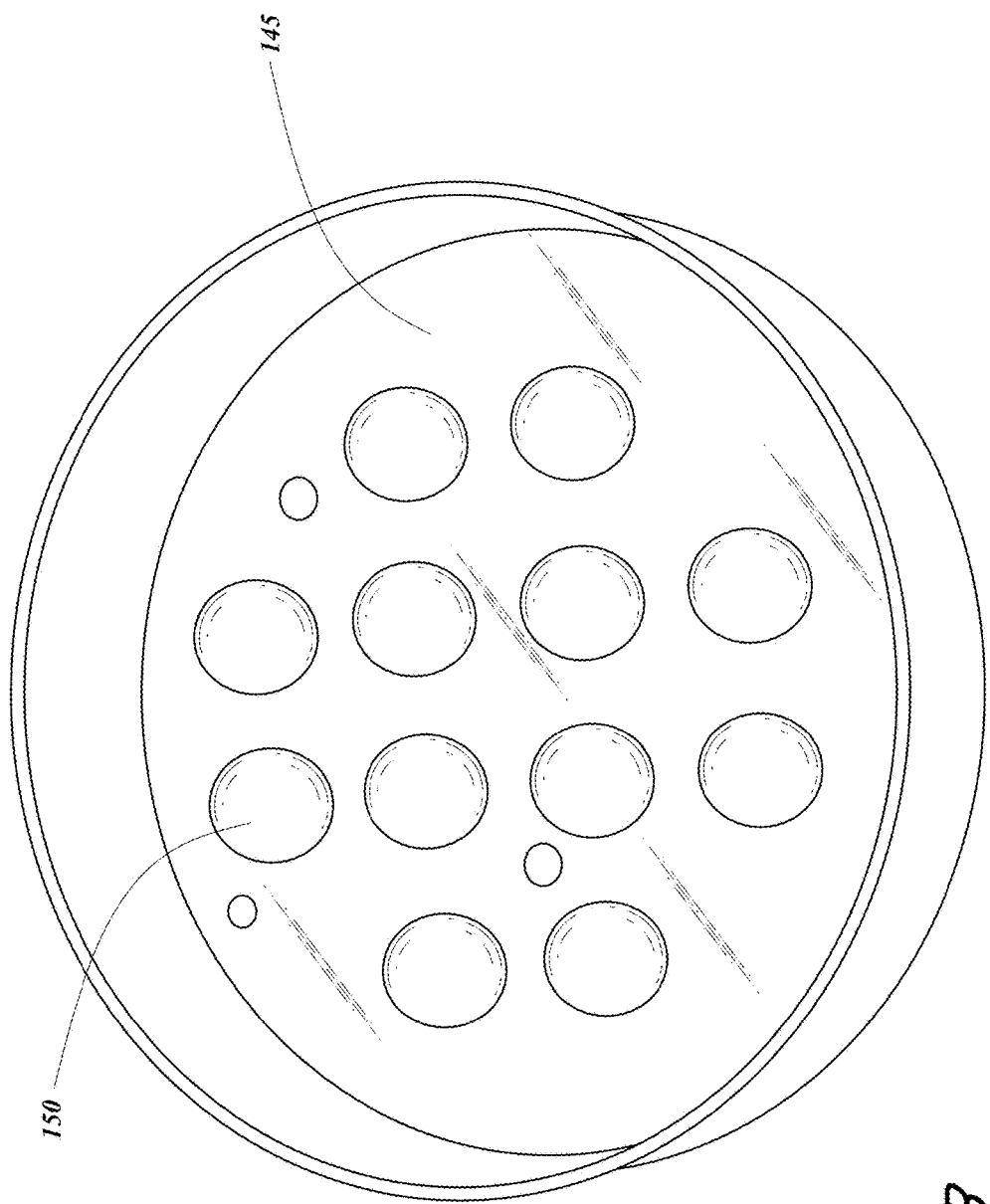

FIGS. 5A and 5B illustrate implementations of another method to form a mold with inverse lens forming features. In this method, the curing agent 145 (e.g., PDMS) is disposed around physical objects 150 instead of around water droplets 140 disposed on a substrate 100 having regions of different amounts of wettability. The physical objects 150 can have different shapes and sizes that are configured to produce lens forming features having different shapes and sizes in the curing agent 145. The physical objects 150 can include a solid material. For example, the physical objects 150 can comprise variety of materials including but not limited to metal, ceramic, glass, polymer, composites, acrylic, plastic, etc. In the illustrated implementations, the physical objects 150 are spherical. However, in other implementations, the physical objects 150 can have a different shape. For example, in various implementations, the physical objects 150 can have a cylindrical shape (e.g., barrel shaped), a disk shape, an oval shape, etc. In the illustrated implementations, all the physical objects 150 appear to be identically shaped and sized. However, in other implementations, one or more of the physical objects 150 can have a different shape and/or size than one or more of the other physical objects 150.

The curing agent 145 can be disposed to cover the physical objects 150 entirely, as shown in FIG. 5A or partially, as shown in FIG. 5B. The depth to which the physical objects 150 are immersed in the curing agent 145 produces lenses forming features that extend to different depths in the mold material. Lens forming features with different shapes and sizes can be used to form lenses with different shapes (e.g., ball lenses, half ball lenses, plano-convex lenses, meniscus lenses, etc.) that provide different optical magnification.

Figure 6:
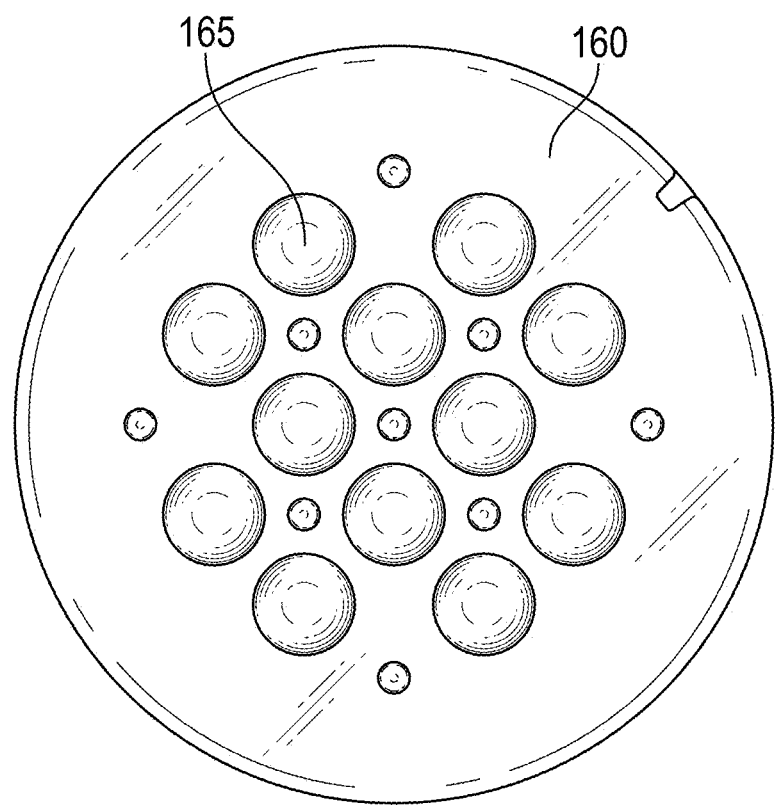
FIG. 6 shows a subsequent operation to that shown in FIGS. 5A and 5B, in which mold has been formed.

The curing agent 145 is cured and separated from the physical object 150 to form a mold 160 including a plurality of lens forming features 165, as shown in FIG. 6. The curing agent 145 can be cured using a variety of methods including but not limited to heating, exposure to radiation (e.g., ultraviolet radiation). In various implementations, the curing agent 145 can harden upon curing such that it can be separated from the physical objects 150 by applying a steady force. For example, in various implementations, the curing agent 145 can be separated from the physical objects 150 by peeling the curing agent 145 upon curing.

Figure 7A:
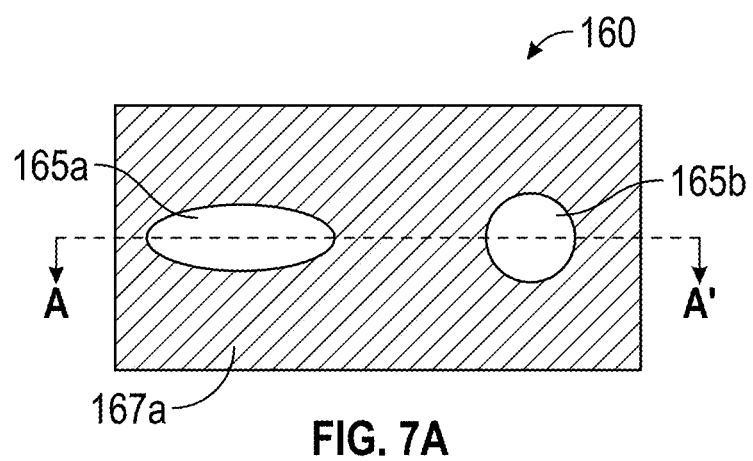
FIG. 7A schematically illustrates a front view of an implementation of a mold including a plurality of lens forming features fabricated by any of the methods described with reference to FIGS. 1-5B.
Figure 7B:
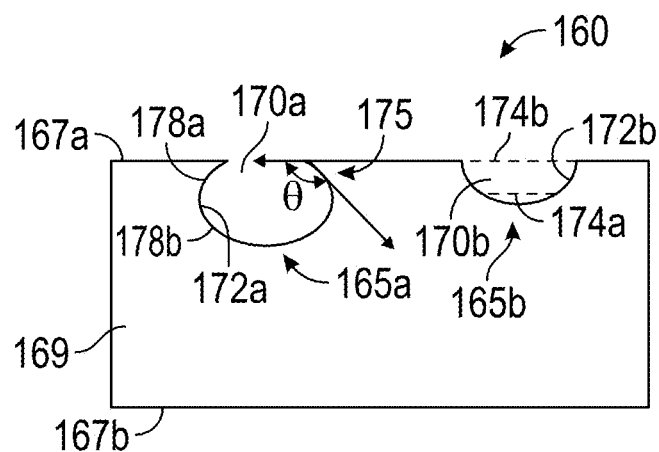
FIG. 7B schematically illustrates a side view of the mold illustrated in FIG. 7A in a plane perpendicular to the surface of the mold along the line A-A'.

FIG. 7A schematically illustrates a front view of an implementation of a mold 160 including a plurality of lens forming features 165a and 165b fabricated by any of the methods described above with reference to FIGS. 1-5B. FIG. 7B schematically illustrates a side view of the implementation of the mold 160 illustrated in FIG. 7A in a plane perpendicular to the surface 167a of the mold and including the axis A-A'. The mold 160 comprises a first surface 167a, a second surface 167b and a volume of mold material 169 enclosed between the first surface 167a and the second surface 167b. The plurality of lens forming features 165a and 165b are formed on the first surface 167a of the mold 160 and extend through the volume of material toward the second material. The plurality of lens forming features 165a and 165b have different sizes and shapes and will yield lenses or optical elements having different optical characteristics. For example, the optical magnification provided by a lens formed by the lens forming feature 165a can be different from the optical magnification provided by a lens formed by the lens forming features 165b. In various implementations, the mold 160 can be flexible such that the lenses formed in the plurality of lens forming features 165a and 165b can be easily removed. In some other implementations the mold 160 can be rigid or semi-flexible. The plurality of lens forming features 165a and 165b that yield lenses or optical elements with different optical characteristic are provided in a single mold 160. Accordingly, lenses or optical elements with different optical characteristics can be simultaneously produced using a single mold. In various implementations, the mold 160 can be a monolithic structure comprising a volume of mold material 169 and a plurality of lens forming features 165a and 165b formed in the volume of mold material. As discussed above, in various implementations, the mold material can comprise PDMS.

The lens forming features 165a and 165b include cavities 170a and 170b that extend from apertures formed on the first surface 167a of the mold 160. The cavities 170a and 170b extend to different depths in the volume of mold material 169. The cavities 170a and 170b of the lens forming features 165a and 165b are bounded by internal walls 172a and 172b respectively. The internal walls 172a and 172b can have a smooth surface such that the optical surfaces of the lenses or optical elements formed by the lens forming features 165a and 165b are sufficiently smooth to provide a desired optical effect. The internal walls 172a and 172b can be tailored to have a desired shape. For example, the internal walls 172a and 172b can be spherical, hemispherical, parabolic, elliptical, aspheric, etc. In various implementations, some of the plurality of lens forming features can comprise one or more undercut structures adjacent the apertures on the first surface 167a. For example, in the illustrated implementation, lens forming feature 165a comprises an undercut structure 175 adjacent the aperture on the first surface 167a. Without any loss of generality, the presence of the undercut structure 175 causes the internal wall 172a of the lens forming feature 165a to have a first convex profile 178a from the aperture toward the second surface 167b and a second convex profile 178b extending between the first convex profile 178a and the second surface 167b. In various implementations, the first convex profile 178a can have a first curvature and the second convex profile 178b can have a second curvature. In various implementations, the curvature of the first convex profile 178a and the second convex profile 178b can be the same. In various implementations, a tangent to the first convex profile 178a can have a positive slope and a tangent to the second convex profile 178b can have a negative slope. The presence of the undercut structure 175 results in the external angle θ between a line passing through an intersection of the undercut structure 175 and the first surface 167a and a line in the plane of the first surface 167a and extending toward the cavity 170a to be greater than 90 degrees as shown in FIG. 7B. In various implementations, the external angle θ can have a value greater than or equal to about 90 degrees and less than or equal to about 180 depending on the curvature of the first convex profile 178a. For example, in various implementations, the external angle θ can have a value between about 120 degrees and about 150 degrees, between about 150 degree and about 180 degrees or there between.

In various implementations, the presence of the undercut structure 175 can result in the size of the opening of the cavity 170a at the first surface 167a to be less than an internal dimension of the cavity 170a. For example, in various implementations, the shortest distance between the opposite sides of the opening of the cavity 170a at the first surface 167a can be smaller than the shortest distance between the opposite sides of the internal wall 172a of the cavity. In contrast for the lens forming feature 165b which does not include an undercut structure, the length of the chord 174b which represents the shortest distance between the opposite sides of the opening of the cavity 170b at the first surface 167a is longer than the length of the chord 174a which represents the shortest distance between the opposite sides of the internal wall 172b of the cavity 170b. Without any loss of generality, lenses formed by lens forming features comprising one or more undercut structures can provide higher optical magnification than lenses formed by lens forming features without one or more undercut structures. Conversely, lens forming features comprising one or more undercut structures can provide higher optical de-magnification than lens forming features without one or more undercut structures.

The plurality of inverse lens forming features 165a and 165b in the mold 160 exhibit an inverse optical effect than the desired optical effect exhibited by the lenses fabricated by using the mold 160. For example, the inverse lens forming features 165 in the mold 160 formed by the method illustrated in FIGS. 5A and 5B function as de-magnifying lenses as noted from FIG. 7C. Accordingly, the lenses fabricated by the mold 160 formed by the method illustrated in FIGS. 5A and 5B would function as magnifying lenses, as discussed below with reference to FIGS. 11 and 12.

II. Apparatuses and Applications

Figure 8:
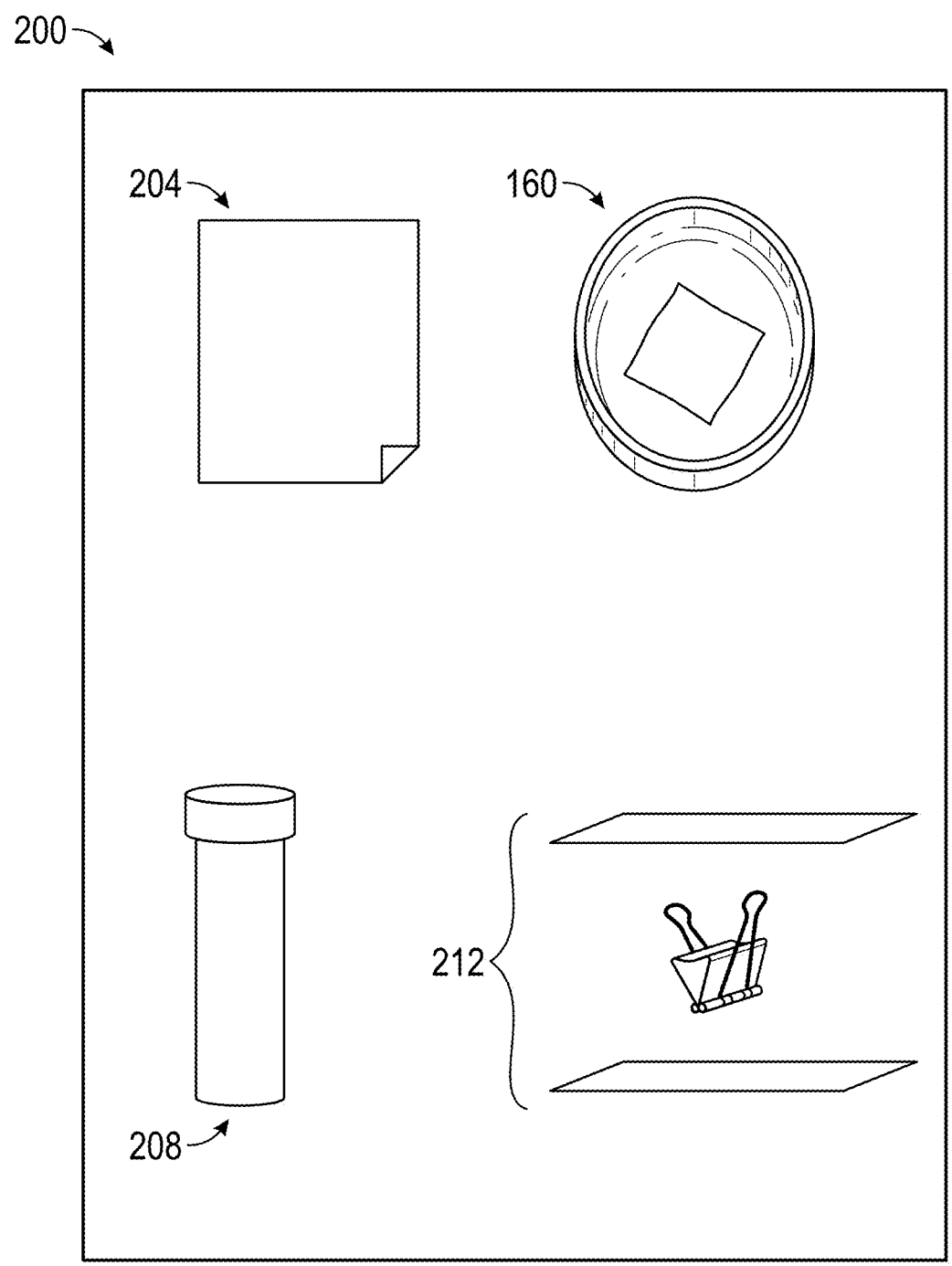
FIG. 8 is a kit useful in an educational setting for helping students better understand optics and manufacturing techniques.
Figure 9:
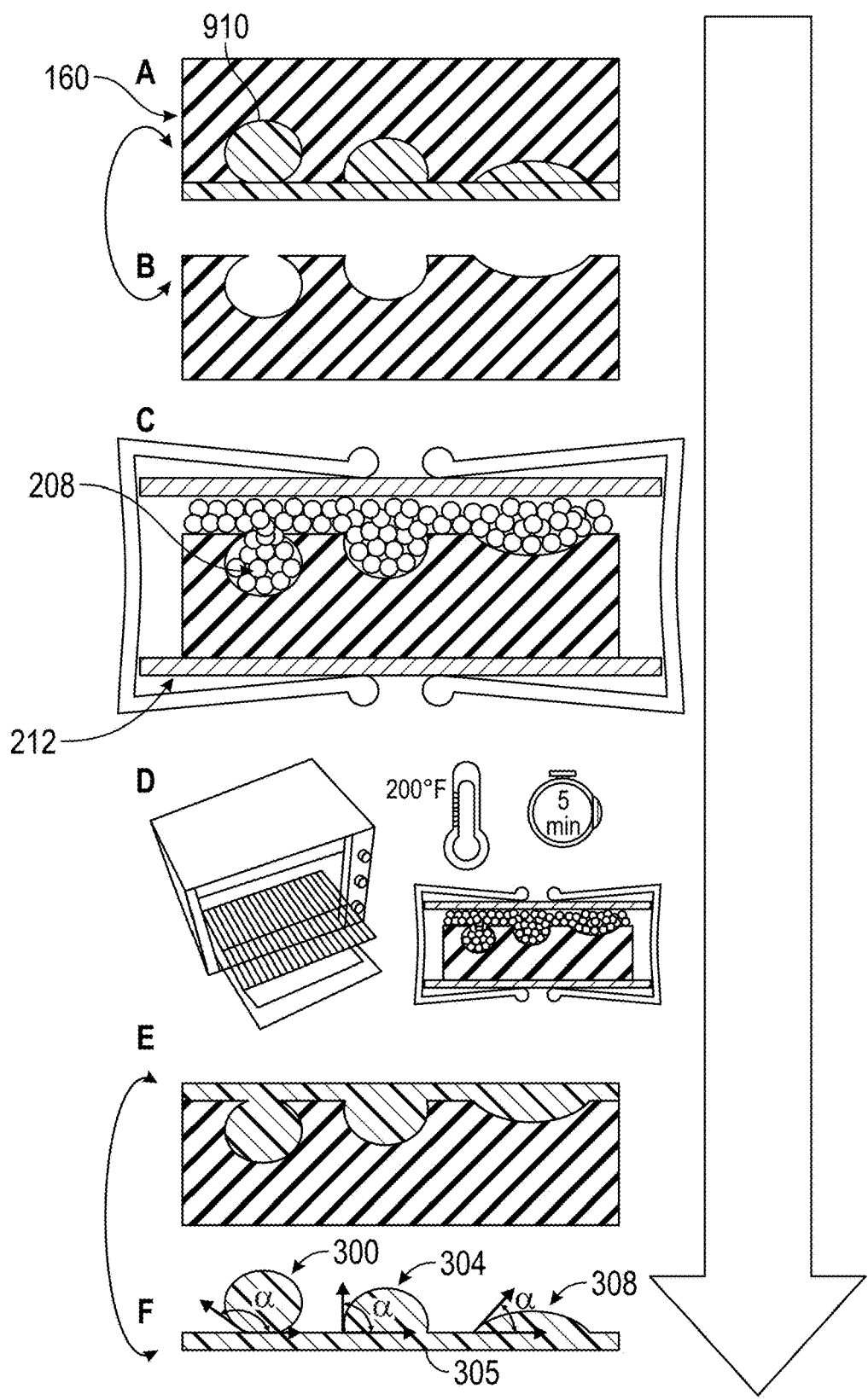
FIG. 9 illustrates a method of forming lenses using a mold formed by the process shown in FIGS. 1-5B and included in the kits of FIG. 8.

The highly efficient and controlled process described above is capable of producing lens molds and lenses for numerous applications, a few of which are discussed below.
A. Kit for Experimental and Educational Use FIGS. 8 and 9 illustrate an education kit 200 and a method of its use to illuminate principles of optics for students in man settings. The kit includes a series of instructions 204 that can take any suitable form. The instructions 204 can include a tutorial on principles of optics that will prepare the student to understand the experiment. The instructions 204 can also explain how to use the other components of the kit 200. The instructions 204 can also include warnings about potential dangers or hazards. In some implementations, the kit 200 need not include the instructions. In various implementations, directions can be provided, for example, on the packaging of the kit 200 and/or included with the kit 200 to a website that includes the instructions.

The kit 200 also includes at least one lens forming mold 160, which is used to form lenses in connection with one or more experiments as discussed in the instructions. The mold 160 can be fabricated by any of the above described methods illustrated in FIGS. 1-4 and/or 5A and 5B. The mold 160 may include a plurality of lens forming features. For example, in various implementations, the mold 160 can include up to five different lens forming features each configured to produce lenses with different optical properties. The features are formed in a material such as PDMS or other material capable of molding high quality optical surface. The various lens forming features can each produce a lens with a different radius of curvature, diameter, magnification, or other optically relevant variable. In some variations of the kit 200, the mold 160 retains a portion of the substrate 100 used in forming the mold, as discussed above.

FIG. 9(a) shows a layer labeled "plastic", which can be a portion of the substrate 100. The substrate portion and the mold 160 may continue to trap the water droplets used to form the lens forming features in the process discussed above. In FIG. 9(a) the retention of the water is illustrated by the reference numeral 910. The plastic layer is removed from the mold 160 to expose the lens forming features, as illustrated in FIG. 9(b), in an early stage of use of the kit 200. If the water droplet has been retained, the lens forming feature in the mold 160 can be dried before lenses are formed therein.

In some embodiments, the kit 200 includes a container 208 containing lens forming material. In various implementations, the lens forming material can include a curable optical quality polymer such as cyclic olefin copolymer (COC). The lens forming material can be provided as pellets, in powder form or in liquid form. The instructions 204 may direct the user to load or fill the lens forming features of the mold 160 with the lens forming material as illustrated in FIG. 9(c). Molding the lens forming polymer can be accomplished in any suitable technique, e.g., under some compressions and/or with heat.

A compression device 212 can be provided in the kit to mold the lens forming polymer into the lens forming elements. The compression device 212 can include plates to be disposed on one or both sides of the mold 160. In various implementations, the lens forming polymer, can be placed between an inside surface of one of the plates and the side of the mold 160 having the lens forming features. A compressive force can be provided by the compression device 212 to hold the lens forming polymer in the lens forming elements until the lens forming polymer is cured. In various implementations, the compression device 212 can include a clamp, a binder clip or other simple compression device. The portion of the lens forming polymer between the lens forming features can create a connecting portion between the lenses that are formed, which can be a useful handling device.

FIGS. 9(e) and 9(f) show that in subsequent operations, the compression device 212 is removed and the lens construct is removed from the mold 160. Other plastic molding techniques such as, for example, hot embossing, injection molding, casting, etc. can also be used to form the lens construct. In the illustrated embodiment, the lens construct includes three lenses 300, 304, 308 disposed on a planar surface 305. The lens 300 has a curvature such that a contact angle $\alpha$ between a tangent passing through the intersection point of intersection of the lens 300 and the surface 305 and a line parallel to the surface and extending from the point of intersection towards the lens 300 is greater than about 90 degrees. The lens 304 has a contact angle $\alpha$ approximately equal to 90 degrees and the lens 308 has a contact angle $\alpha$ less than about 90 degrees. The lenses 300, 304 and 308 having different contact angles provide different amounts of optical magnification. Without any loss of generality, lens 300 which has the highest contact angle $\alpha$ between the three lenses 300, 304 and 308 provides the highest optical magnification between the three lenses 300, 304 and 308 and lens 308 which has the lowest contact angle $\alpha$ between the three lenses 300, 304 and 308 provides the lowest optical magnification between the three lenses 300, 304 and 308. The instructions 204 can describe experiments to test and characterize the performance of the lenses.

Thus, the smooth and symmetrical lens forming molds 160 included in the kit 200 can be used as educational kits due to the simple fabrication technique. These lenses can be used for educational outreach, and kits can be sold to teach students about optics.

In one variation of the kit 200, the lenses 300, 304, 308 are included in the kit 200 such that the student can focus their attention on the optics principles without taking time to produce the lenses. This would enable students who don't have access to an oven to use the kit 200.

Figure 10:
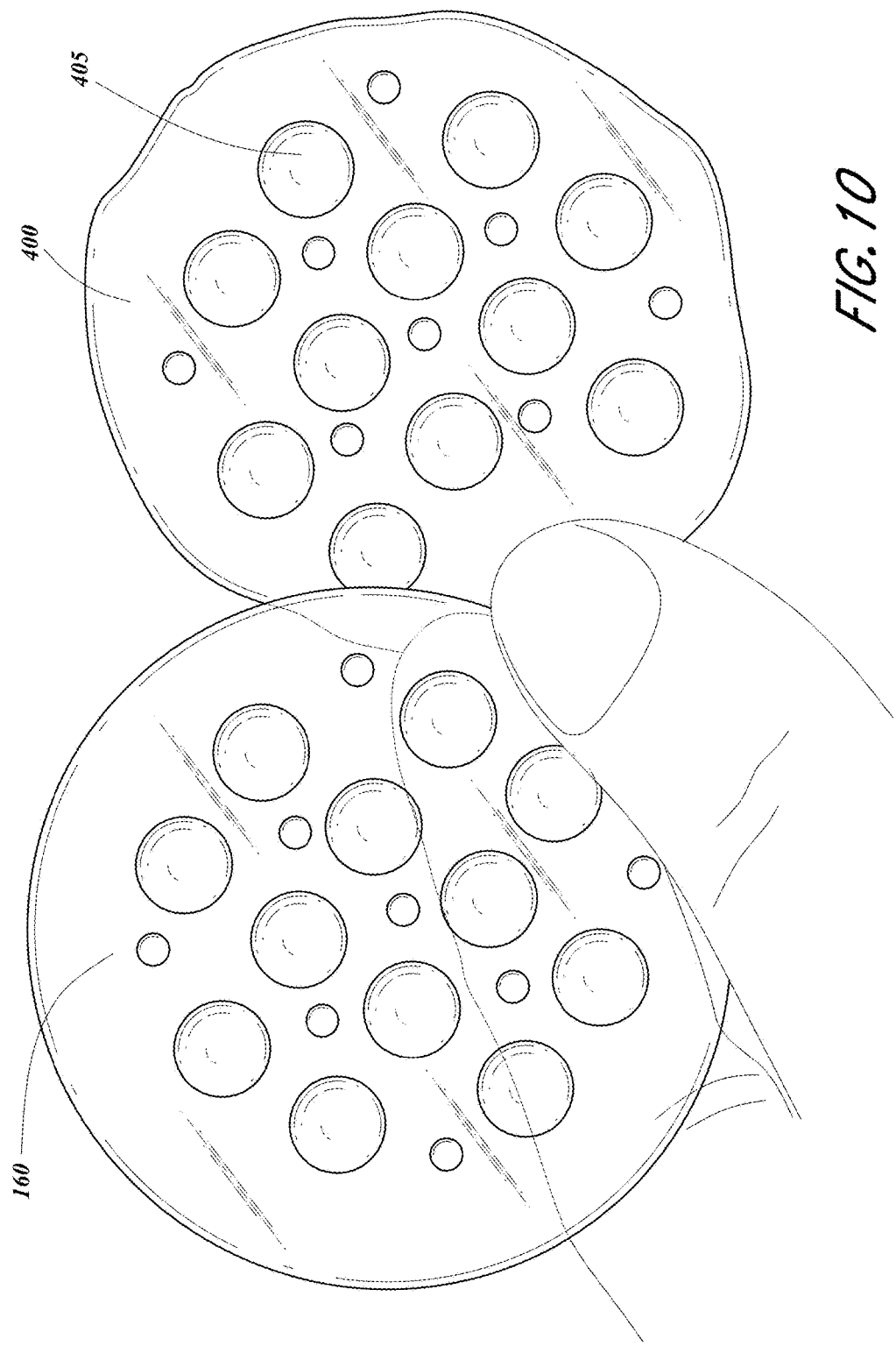
FIG. 10 illustrates lenses formed by using a mold formed by the process shown in FIGS. 5A, 5B and 6 and included in the kits of FIG. 8.

FIG. 10 illustrates a lens sheet 400 including lenses 405 formed by using the mold 160 illustrated in FIG. 6 that is formed by the process shown in FIGS. 5A and 5B and included in the kits 200 of FIG. 8. The lenses 405 can be formed by molding a polymer (e.g., cyclic olefin copolymer (COC)) using the mold 160. The molding techniques described above with references to FIGS. 9(c)-9(f) can be used to form the lens sheet 400 including the lenses 405. Other plastic molding techniques such as, for example, hot embossing, injection molding, casting, etc. can also be used to form the lens sheet 400 including the lenses 405.

Figure 11:
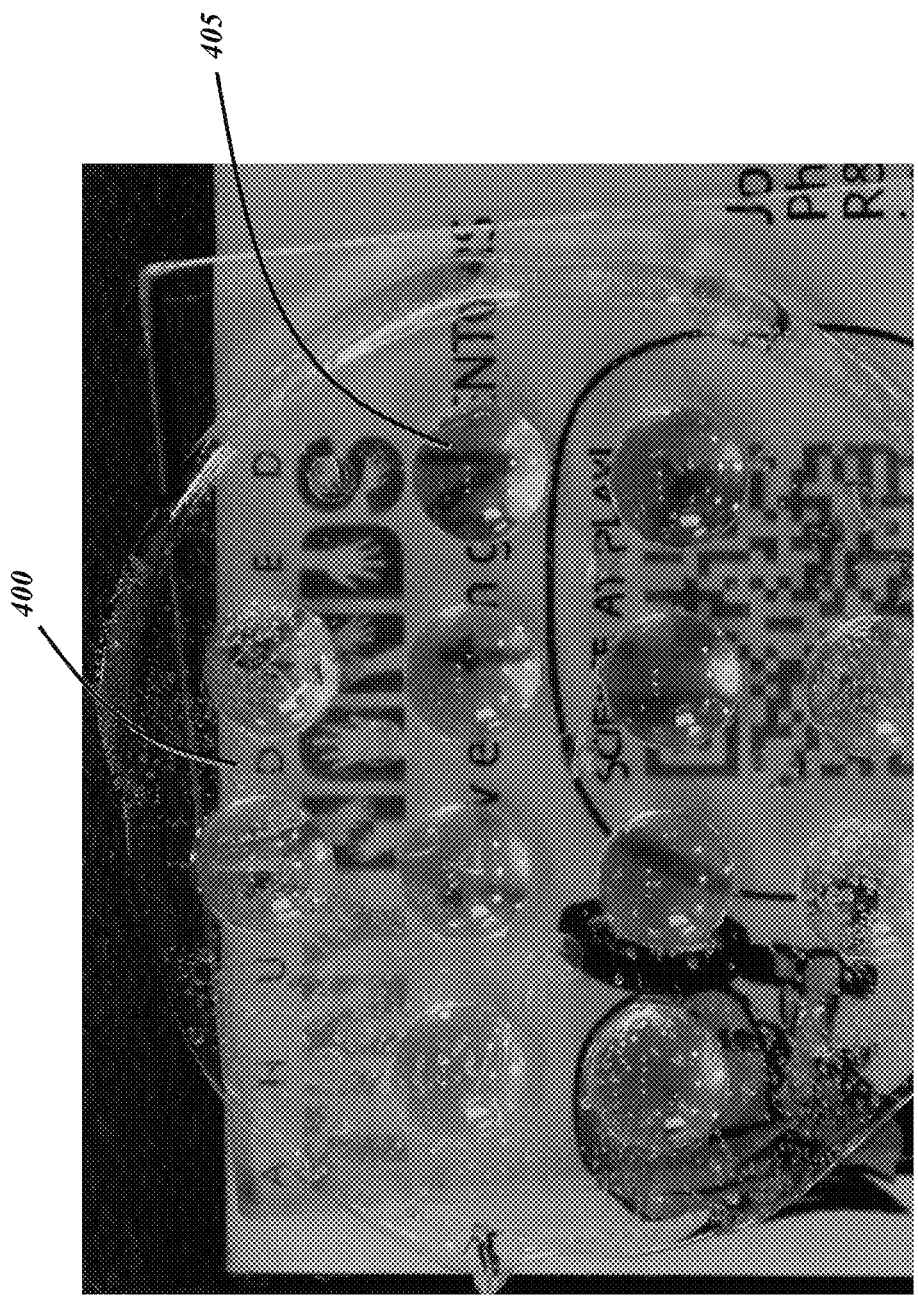
FIGS. 11 and 12 illustrate the optical effects produced by the lenses shown in FIG. 10.
Figure 12:
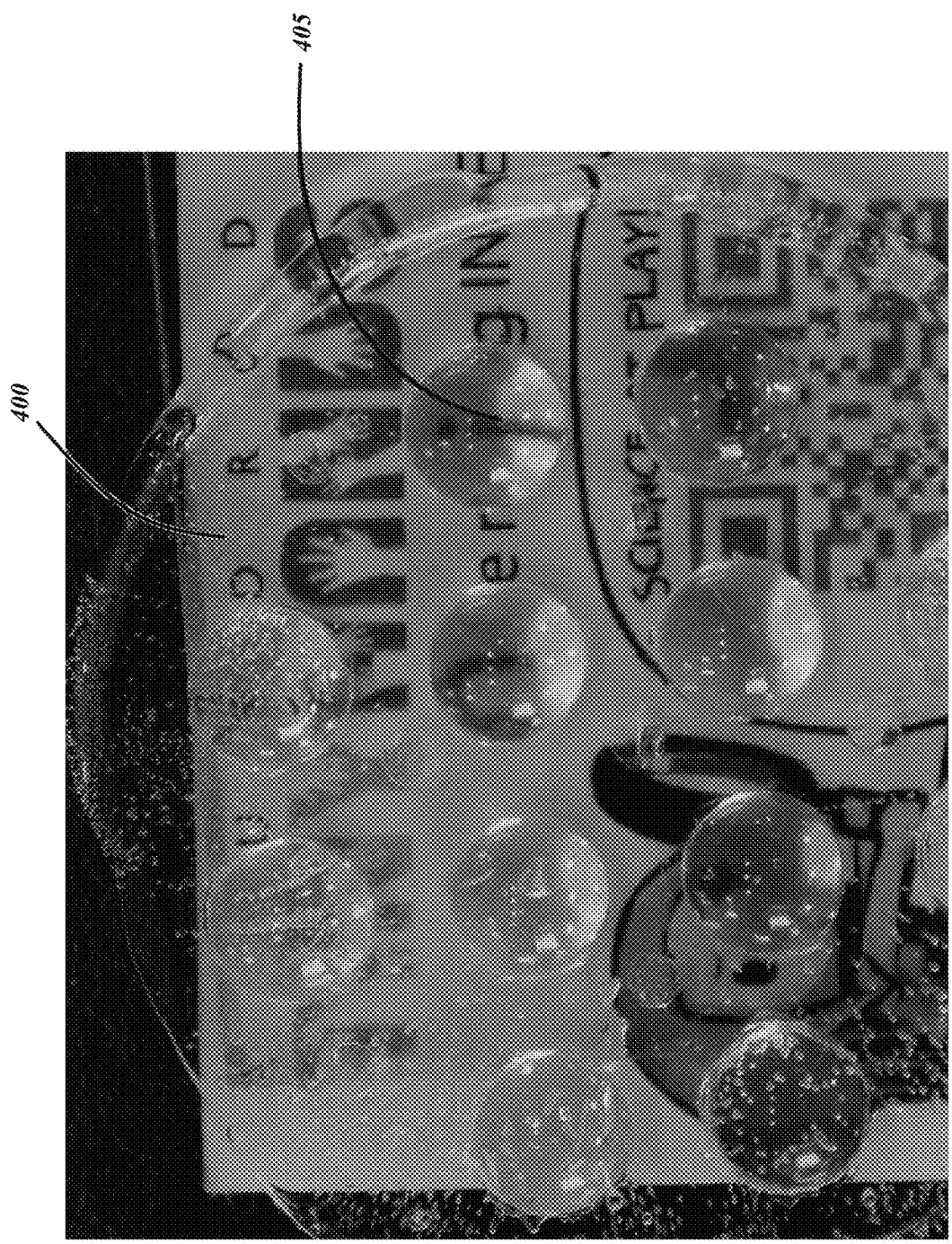

FIGS. 11 and 12 illustrate the optical effects produced by the lenses shown in FIG. 10. As noted from FIGS. 11 and 12, the lenses 405 included in the lens sheet are capable of providing optical magnification. In various implementations, the lenses 405 can be configured to provide optical magnification in the range bet The lenses formed by molding a polymeric material (e.g., COC) using a mold 160 formed by one of the methods described in FIGS. 1-4 and/or 5A and 5B can be configured to provide optical magnification, optical de-magnification or other optical effects. The amount of magnification, de-magnification or other optical effects provided by the lenses formed by the methods described above can depend on the radius of curvature of the curved surface of the lenses, the shape of the lens, the curvature of the lens, the refractive index of the material of the lenses, etc. For example, in various implementations, the lenses formed by the methods described above can be configured to provide optical magnification in a range between greater than 1× and less than or equal to 100×. In various implementations, lenses providing optical magnification in the range between about 10× and about 75×, between about 20× and 50×, or there between can be fabricated using the methods described herein. As another example, in various implementations, the lenses formed by the methods described above can be configured to provide optical de-magnification. As yet another example, in various implementations, the lenses formed by the methods described above can be configured to provide other optical effects such as diffractive effects, scattering effects, etc. One or more molds that can be used to form lenses that provide optical de-magnification or other optical effects can be included in the kits 200. In various implementations, features that can be used to form de-magnifying lenses and/or components that provide other optical effects can be included in the same mold as the features that can be used to form magnifying lenses.

B. Cameras and Magnifying Devices

Another important use for the techniques is the production of lenses for industrial uses. The lenses herein can be integrated into current optical systems such as a simple camera phone or high magnification tool, e.g., a microscope. Since, the lenses can be configured to have different sizes and different shapes, their optical properties can be tailored according to the imaging application. Since, the lens forming features of the mold can be formed with increased accuracy and precision, lenses with desired optical characteristics can be fabricated easily using the methods described herein. Implementations of lenses fabricated using them methods described herein can be for different imaging applications.

Also, because the manufacturing of lenses according to the processes described herein is performed by a very simple method, the lenses can be made very close to when they are needed. For example, lenses can be fabricated in the field using the methods and/or the kits described herein. The methods described herein can also be used to fabricate single use lenses for medical applications or point-of-care devices that are used for a short interval of time and then disposed. Such lenses can be fabricated using polymers that have good initial optical quality but are less stable over time which may be less expensive. Thus, the methods discussed above can be used to produce limited or single use lenses in the field.

C. Point of Care Devices

Another benefit of the methods and lenses herein is that they can provide for good optics and magnification and thus may be coupled with mobile devices, such as cell phones to provide an inexpensive, high magnification point of care (POC) tool. This can be especially helpful for POC diagnostics or in regions where costly and bulky microscopes are not accessible. The lenses may be able to observe very small objects such as biological components due to the shape of the lens. As noted above, the lenses can be made by a user when needed and be of limited or single use if appropriate.

III. Advantages

Other techniques that came before are disadvantageous on multiple levels. The disadvantages for photoresist methods include the limitation of materials (such as photoresist thickness or surface tension), serial processing, costly masters, and/or low numerical apertures. Other techniques are good for making high quality glass lenses, but such lenses do not meet the present goal of producing plastic lenses, as such glass lens methods require costly production methods.

Regions with higher and lower wettability are used to create lenses in plastics in a simple and inexpensive manner. The shape of water droplets is easily controlled by a simple chemical modification the surface using a tape or other simple mask. Water is then molded with a good mold forming material, such as PDMS, to form smooth, hemispherical inverse lenses which can be molded into COC. The entire process can be scaled up for large manufacturing and all steps are inexpensive. The shape of the water droplets can also form lenses with high numerical apertures for high magnification. The fabrication method does not require expensive equipment, and the lenses can even be achieved in a classroom setting, making them ideal for educational outreach tools.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A kit comprising:
   a monolithic mold having a first surface and a second surface, the monolithic mold enclosing a volume of a mold material between the first and the second surface, the monolithic mold including a plurality of lens forming features open to the first surface and extending through the volume of the mold material toward the second surface, wherein a cross-section of at least one of the plurality of lens forming features in a plane perpendicular to the first surface includes a curve, wherein the at least one lens forming feature is undercut such that a minimum spacing between opposing sides of the curve at a first location adjacent to the first surface is less than the minimum spacing between opposing sides of the curve at a second location between the first location and the second surface of the mold; and an amount of a lens forming polymer sufficient to fill the plurality of lens forming feature, wherein the plurality of lens forming features are configured to have a size such that the lenses formed by molding the lens forming polymer using the monolithic mold provide optical magnification between about 1× and about 100×.

2. The kit of claim 1, wherein the mold material comprises a polymeric material and the monolithic mold comprising the plurality of lens forming features is formed by flowing the polymeric material around a plurality of physical objects.

3. The kit of claim 2, wherein the plurality of lens forming features are formed by flowing the polymeric material around a plurality of physical objects comprising a water droplet.

4. The kit of claim 3, wherein the water droplet is formed by disposing water on a substrate with regions of higher and lower wettability.

5. The kit of claim 4, wherein the water droplet has a contact angle (CA) between about 5 degrees and about 180 degrees.

6. The kit of claim 2, wherein the plurality of lens forming features are formed by flowing the polymeric material around a plurality of physical objects comprising a solid material.

7. The kit of claim 1, further comprising a compression device configured to hold the lens forming polymer in the lens forming features.

8. The kit of claim 1, further comprising a set of instruction for directing a user to manufacture and use an optical magnifying device using the monolithic mold and the lens forming polymer.

9. The kit of claim 1, wherein some of the plurality of lens forming features have a different size than some other of the plurality of lens forming features.

10. The kit of claim 1, wherein some of the plurality of lens forming features have a different shape than some other of the plurality of lens forming features.

11. The kit of claim 1, wherein the plurality of lens forming features are configured to have a size such that the lenses formed by molding the lens forming polymer using the monolithic mold provide optical magnification between about 10× and about 75×.

12. The kit of claim 1, wherein the plurality of lens forming features are configured to have a size such that the lenses formed by molding the lens forming polymer using the monolithic mold provide optical magnification between about 20× and about 50×.

13. The kit of claim 1, wherein a length of a radius of at least one of the plurality of lens forming features is between about 1 cm and about 10 cm.

14. The kit of claim 1, wherein a diameter of at least one of the plurality of lens forming features is between about 1 cm and about 10 cm.

15. The kit of claim 1, wherein a length of a largest chord joining opposing sides of an internal surface of at least one of the plurality of lens forming features is between about 1 cm and about 10 cm.

* * * * *